Figure 1:
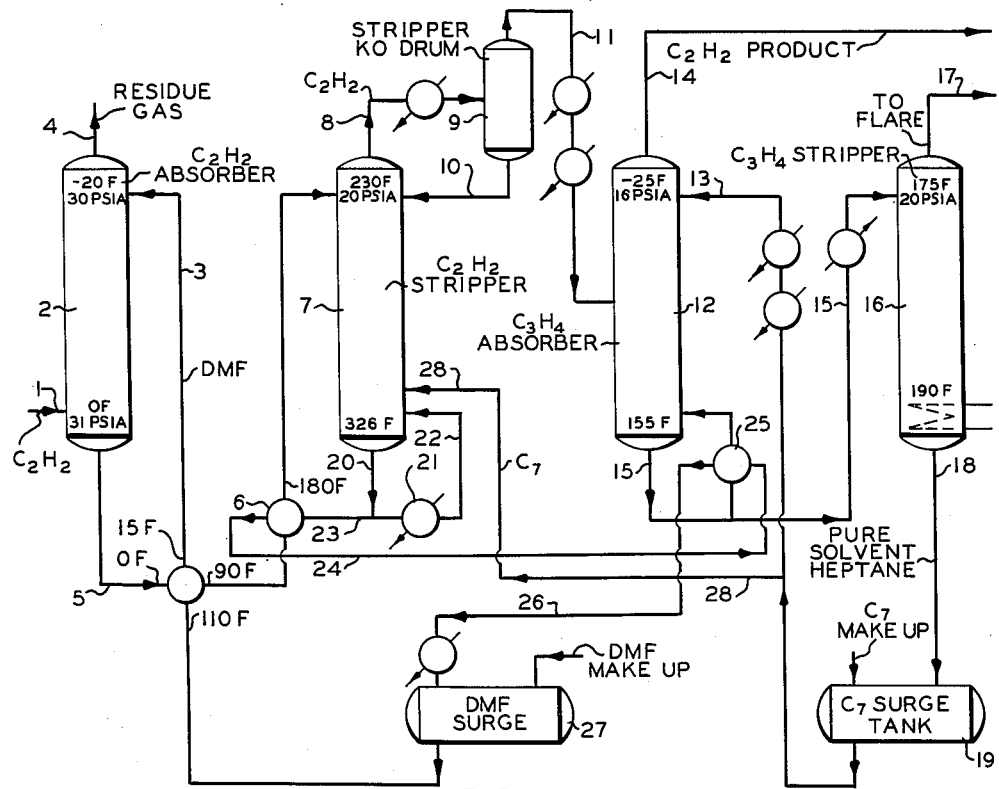

INVENTORS
D. E. GRIFFIN
H. S. KIMBLE

United States Patent Office 3,034,272
Patented May 15, 1962

3,034,272
ACETYLENE RECOVERY AND PURIFICATION
METHOD
Donald E. Griffin and Harvey S. Kimble, Bartlesville, Okla., assignors to Phillips Petroleum Company, a corporation of Delaware
Filed Nov. 23, 1959, Ser. No. 854,766
7 Claims. (Cl. 55—65)

This invention relates to the recovery and purification of acetylene. In one of its aspects, the invention relates to a stripping operation wherein acetylene is recovered from an absorbent or solid containing the same, using in the stripping zone wherein the recovery is effected, a paraffin hydrocarbon which is gaseous under conditions prevailing in the stripping zone. In another of its aspects, the invention relates to an acetylene recovery and purification operation wherein a stripping gas containing acetylene and heavier is treated in an absorbing zone with a paraffin hydrocarbon absorbent to remove heavier than acetylene from said stream, obtaining the paraffin hydrocarbon containing said heavier than acetylene portion of said stream, stripping said heavier than acetylene portion from said paraffin hydrocarbon and utilizing the thus stripped paraffin hydrocarbon as the paraffin hydrocarbon which is used in the acetylene stripping zone. In a further aspect of the invention, overhead gases from the acetylene stripping zone are passed through an acetylene absorbent or solvent knockout zone before passing said gases to the treatment with paraffin hydrocarbon to remove the heavier than acetylene from said gases. In a still further aspect of the invention, it relates to the provision and utilization of a further knockout zone for removing paraffin hydrocarbon from the overhead of the absorbent or solvent knockout zone before passing the gases to the absorption of heavier than acetylene therefrom while returning knocked-out paraffin hydrocarbon to said acetylene stripping zone.

Processes for the manufacture of acetylene and processes for recovering and purifying acetylene are well known. In one operation for the manufacture of acetylene, a fuel gas and an oxidant are introduced into a furnace tangentially creating a hot mass of combustion gases with which there is admixed by axial introduction a hydrocarbon feed to be converted to acetylene during a relatively short contact time of the order of a second or fraction thereof at a temperature in the neighborhood of about 1,500° F. and a pressure of, say, 15 p.s.i.a. A mixture of combustion gases and reaction product containing acetylene and heavier gases including heavier acetylenes such as vinylacetylene are quenched by direct contact with water and further cooled whereupon there is obtained ultimately a gaseous stream free from heavy tars, oils, etc. The reaction effluent is dehydrated, for example, according to the method set forth, described, and claimed in U.S. Patent 2,871,719, issued February 3, 1959, R. C. Scofield, and then passed to an acetylene absorption system which can be operated at a low temperature, for example, as set forth, described, and claimed in Serial Number 441,809, filed July 7, 1954, now U.S. Patent 2,900,044, issued August 18, 1959 to R. C. Scofield.

The thermal stripping operations in which acetylene is involved are known to be not without an ever present danger from violent decomposition of explosive acetylenic compounds which can form in the stripping zone. Thus, care must be taken to avoid that the partial pressure of acetylene exceeds a safe limit which ordinarily is around 25 p.s.i.a. The presence of heavy acetylenes increases the danger since, when heavy acetylenes are present, they tend to polymerize under stripping conditions forming quite unsuitable polymers which are, of course, subject to violent decomposition.

It has now been conceived that the partial pressure and concentration of acetylene and heavier than acetylene in the kettle or reboiler acetylene stripper can be kept to a desired minimum, that is, below a safe maximum, by introducing a paraffinic stripping agent and/or vapor pressure controlling agent into the stripper at its bottom portion. Presently, the preferred point of introduction is just a few trays above the reboiler.

It is an object of this invention to provide a process for the recovery and purification of acetylene. It is a further object of this invention to provide an improved operation for stripping acetylene from an absorbent containing the same at reduced partial pressure of the acetylene. It is a further object of this invention to provide a combination operation in which acetylene and heavier than acetylene are stripped from an absorbent and heavier than acetylene is absorbed from the acetylene contained in the gaseous stream thus obtained and wherein an element of the heavier than acetylene absorption step provides an ingredient for the stripping operation.

According to this invention there is provided a method of stripping acetylene from an absorbent containing the same which comprises performing said stripping in the presence of a paraffin which is vaporous or gaseous under the stripping conditions of the operation.

Further, according to this invention, there is provided a method of stripping acetylene from an absorbent containing the same wherein there is introduced into the stripping operation absorbent recovered from a later absorption operation wherein heavier than acetylene is absorbed away from the acetylene in the gases resulting from said stripping operation.

Also according to the invention, as an important concept thereof, the use of heptane is particularly expedient since, as a part of the method, we employ an absorption step for removal of heavy acetylenes, using as an absorbent, normal heptane.

It is within the scope of the invention to provide a paraffinic stream of varying composition and/or to introduce such a stream at more than one place to the stripping tower or zone. Included among the paraffinic materials which can be used are those which are gaseous under the conditions maintained in the stripping zone and these include the paraffin hydrocarbons butane, pentane, hexane, heptane, and octane and mixtures thereof. The stripping agent has the following effects.

(1) The partial pressure of acetylenes is reduced as is the explosive range due to the reduction of partial pressure.

(2) The explosive range is reduced due to the diluent effect.

(3) By introducing the gas above the reboiler the acetylene will be stripped both by the reboiled vapor and by the stripping gas. This will keep the amount of acetylenes in the 300° F.+ reboiler to practically zero.

The inventive features of our process will be further clarified by reference to the drawing, in which an acetylene containing gas which has had impurities such as $H_2O$ and heavy tars removed from it is treated.

Figure 2:
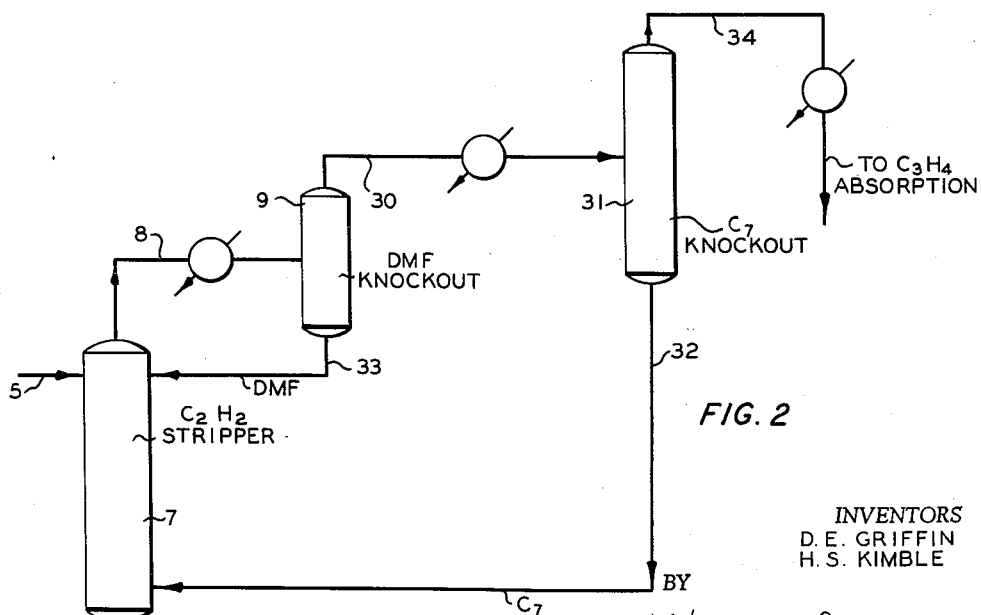

FIGURE 1 is a diagrammatic showing of an embodiment of the invention in which the paraffinic agent is introduced into an acetylene stripping zone and in which there is also employed a heavier than acetylene absorbing zone in which said paraffinic agent is used to absorb heavier than acetylene from the stream of gases emanating from the acetylene stripping zone. FIGURE 2 is a modification of that portion of FIGURE 1 which is comprised between the acetylene stripping zone and the heavier than acetylene absorbing zone as will appear in more detail herein.

Referring now to FIGURE 1 of the drawing, the acetylene containing gas is introduced by way of conduit 1 into an absorber 2 in which it is countercurrently contacted with DMF introduced into absorber 2 by way of conduit 3. Residue gas is removed overhead via conduit 4 and removed from the system. The rich solvent stream is removed from the bottom of the absorber by way of conduit 5, passing in heat exchange relationship with lean DMF solvent. The rich stream is further heated in heat exchanger 6 and is then passed to the top of $C_2H_2$ stripper 7. The overhead from the stripper 7, containing product acetylene and small amounts of heavy acetylenes pass via conduit 8 into knockout pot 9 in which entrained DMF is removed from the gases and returned to stripper 7 via conduit 10. The gases pass from knockout pot 9 via conduit 11 and flow to heavy acetylene absorber 12. This absorber serves to remove heavy acetylenes by absorbing them in n-heptane introduced into the column by way of line 13. Pure acetylene is removed to storage by way of conduit 14. The bottoms from absorber 12 pass via conduit 15 to $C_3H_4$ stripper 16 for removal of heavy acetylene from the solvent. Residue gases are sent to flare via line 17. Pure solvent is removed via conduit 18 and passes to a heptane storage tank 19. Returning now to the $C_2H_2$ stripper 7, lean solvent is removed via conduit 20. A portion of the lean solvent is heated in reboiler 21 and returned to the stripper through pipe 22. The remaining portion passes by way of pipe 23 in heat exchange relationship with rich solvent in heat exchanger 6, as previously described, and is passed to further heat exchange relationship by way of pipe 24 with the rich solvent from the heavy acetylene absorber in heat exchanger 25. From heat exchanger 25 the lean DMF passes via conduit 26 to DMF surge tank 27. In accordance with the inventive concept described above, a portion of stream 13 is passed via line 28 and introduced as a vapor into $C_2H_2$ stripper 7 a few trays above the reboiler section of stripper 7. While it is not shown on the drawing it will be obvious that stream 28 will require heating before its introduction into stripper 7 as a vapor.

Referring now to FIGURE 2, a variation of the invention, separate knockout pots are employed for removing $C_7$ and DMF. In this figure, $C_2H_2$ rich DMF entering tower 7 through pipe 5 is stripped as shown in FIGURE 1. The overhead, containing entrained DMF and heptane passing by way of pipe 8 is passed to knockout vessel 9 operating under conditions such that substantially all DMF is condensed. The remaining gases are passed by way of pipe 30 to knockout vessel 31 in which n-heptane is condensed and recycled by way of pipe 32 to $C_2H_2$ stripping column 7. Thus, DMF is returned to tower 7 by way of pipe 33 while heptane is returned by pipe 32 with each stream entering tower 7 at an appropriate place as shown. Residue gas passes by way of pipe 34 to heavy acetylene absorber 12 of FIGURE 1 for further treatment as in FIGURE 1.

The following tabulation gives, by way of example, flow rates for the operation, conditions of which are found in FIGURE 1 of the drawing.

acetylene is separated from acetylene, utilizing as an absorbent, the paraffin used as a stripping medium.

We claim:

1. A method for the recovery and purification of acetylene from a stream of gases containing acetylene and heavier than acetylene which comprises, in combination, the steps as follows: absorbing acetylene and heavier from said gases into an absorbent, passing thus enriched absorbent to an acetylene stripping zone, also introducing into said stripping zone a paraffin hydrocarbon which is gaseous under the conditions of operation maintained in said stripping zone, in said stripping zone stripping acetylenes from said absorbent, recovering said absorbent from said stripping zone, passing desorbed acetylenes containing gases to a heavier than acetylene absorption zone, in said absorption zone contacting said gases with a paraffin hydrocarbon under absorption conditions to remove heavier than acetylene from said gases, recovering the acetylene as a product from said absorption zone, recovering from said absorption zone said paraffin hydrocarbon containing heavier than acetylene, recovering heavier than acetylene from said paraffin hydrocarbon containing the same, and passing said paraffin hydrocarbon from which heavier than acetylene has been recovered into said acetylene stripping zone as said paraffin hydrocarbon which is introduced into said stripping zone.

2. A method according to claim 1 wherein the gases emanating from the acetylene stripping zone are treated to remove any entrained solvent therefrom and further treated to remove at least a portion of paraffin hydrocarbon therefrom, the paraffin hydrocarbon is returned to the stripping zone and the thus treated gases are passed to a heavier than acetylene zone.

3. A method for the recovery and purification of acetylene from a stream of gases containing acetylene and heavier than acetylene which comprises, in combination, the steps as follows: absorbing acetylene and heavier from said gases into an absorbent, passing thus-enriched absorbent to an acetylene-enriched absorbent reboiling zone, introducing into said reboiling zone a paraffin hydrocarbon which is gaseous under the conditions of operation maintained in said reboiling zone, in said reboiling zone, boiling acetylenes from said absorbent, recovering said absorbent from said reboiling zone, passing desorbed acetylenes containing gases including paraffin hydrocarbon to a heavier than acetylene absorption zone, in said absorption zone, contacting said gases, including said paraffin hydrocarbon with a paraffin hydrocarbon under absorption conditions to remove heavier than acetylene from said gases, recovering the acetylene as a product from said absorption zone, recovering from said absorption zone said paraffin hydrocarbon containing heavier than acetylene, recovering heavier than acetylene from said paraffin hydrocarbon container the same, and passing said paraffin hydrocarbon from which heavier than acetylene has been recovered into said reboiling zone as said paraffin hydrocarbon which is introduced into said reboiling zone.

| Stream Number | 5 | 8 | 10 | 11 | 13 | 14 | 15 | 17 | 18 | 23 | 28 |
|---|---|---|---|---|---|---|---|---|---|---|---|
| Units, mols/hr.: | | | | | | | | | | | |
| $CO_2$ | 0.4 | 0.4 | ------ | 0.4 | ------ | 0.4 | ------ | ------ | ------ | ------ | ---- |
| $C_2H_2$ | 122.5 | 144.7 | 22.2 | 122.5 | ------ | 122.0 | 0.5 | 0.5 | ------ | ------ | ---- |
| $C_3H_4$ | 1.0 | 1.2 | 0.2 | 1.0 | ------ | 0.3 | 0.7 | 0.7 | ------ | ------ | ---- |
| $C_4H_4$ | 1.0 | 1.4 | 0.4 | 1.0 | ------ | ------ | 1.0 | 1.0 | ------ | ------ | ---- |
| $C_7H_{16}$ | ------ | 100.0 | 92.9 | 7.1 | 136.0 | ------ | 143.1 | 0.1 | 143.0 | ------ | 7.1 |
| DMF | 1,675.0 | 33.6 | 33.5 | 0.1 | ------ | ------ | 0.1 | ------ | 0.1 | 1,674.9 | ---- |
| | 1,799.9 | 281.3 | 149.2 | 132.1 | 136.0 | 122.7 | 145.4 | 2.3 | 143.1 | 1,674.9 | 7.1 |

Reasonable variation and modification are possible within the scope of the foregoing disclosure, the drawings, and the appended claims to the invention the essence of which is that a paraffinic stripping medium is employed to strip acetylene from a solvent in which it has been absorbed and that this concept has been combined in a combination with a second absorbing step wherein heavy 4. A method according to claim 1 wherein the paraffin hydrocarbon is heptane.

5. A method according to claim 3 wherein the paraffin hydrocarbon is heptane.

6. A method in the recovery of acetylene and heavier than acetylene from a gas containing the same which comprises the steps of absorbing in a solvent, acetylene and heavier than acetylene, removing from said solvent acetylene and heavier than acetylene with the aid of a paraffin hydrocarbon which is gaseous under the conditions of said removal, treating, in an absorbing zone, a stream of paraffin in gaseous form containing acetylene and heavier, thus obtained, with a paraffin in liquid form to remove heavier than acetylene from said stream, obtaining liquid paraffin containing said heavier than acetylene, stripping said heavier than acetylene from the liquid paraffin and reusing said liquid paraffin to remove further amounts of heavier than acetylene from further amounts of said stream of paraffin gases.

7. A method in the recovery of acetylene and heavier than acetylene from a gas containing the same which comprises the steps of absorbing in a solvent, acetylene and heavier than acetylene, removing from said solvent acetylene and heavier than acetylene with the aid of a paraffin hydrocarbon which is gaseous under the conditions of said removal, treating in an absorbing zone a stream of paraffin, in gaseous form, containing acetylene and heavier, thus obtained, with a paraffin in liquid form to remove heavier than acetylene from said stream, obtaining liquid paraffin containing said heavier than acetylene, stripping said heavier than acetylene from the liquid paraffin and reusing said liquid paraffin by converting the same to a gaseous form and then using the aqueous paraffin as said paraffin hydrocarbon which is gaseous and is used as aid in said removal.

References Cited in the file of this patent
UNITED STATES PATENTS

| | | |
|---|---|---|
| 2,659,453 | Robinson | Nov. 17, 1953 |
| 2,670,810 | Dorsey | Mar. 2, 1954 |
| 2,726,734 | Nirenberg | Dec. 13, 1955 |
| 2,900,044 | Scofield | Aug. 18, 1959 |